United States Patent [19]

Guinn et al.

[11] Patent Number: 4,815,265

[45] Date of Patent: Mar. 28, 1989

[54] HARVESTING HEADER HAVING TIMED DOUBLE SICKLE TOOTHED BELT DRIVE

[75] Inventors: Ronald K. Guinn, Valley Center; Cecil L. Case, Newton, both of Kans.

[73] Assignee: Hay & Forage Industries, Hesston, Kans.

[21] Appl. No.: 72,968

[22] Filed: Jul. 14, 1987

[51] Int. Cl.⁴ .......................................... A01D 34/00
[52] U.S. Cl. ...................................... 56/297; 56/296; 56/11.6; 474/63; 474/205
[58] Field of Search ................. 56/11.6, 296, 297; 474/61, 62, 63, 203, 205

[56] References Cited

U.S. PATENT DOCUMENTS

| | | | |
|---|---|---|---|
| 150,655 | 5/1874 | Danfee | 474/62 |
| 1,301,026 | 4/1919 | Yeaton | 474/63 |
| 2,691,421 | 10/1954 | Swanson | 474/62 |
| 2,718,790 | 9/1955 | Hughey | 474/62 |
| 3,546,864 | 12/1970 | White | 56/296 |
| 3,941,003 | 3/1976 | Garrison et al. | 56/296 |
| 4,246,742 | 1/1981 | Clark et al. | 56/297 |
| 4,642,071 | 2/1987 | Botton | 474/63 |
| 4,679,999 | 7/1987 | Wetzel | 474/205 |

Primary Examiner—John Weiss
Attorney, Agent, or Firm—Hovey, Williams, Timmons & Collins

[57] ABSTRACT

Sprockets of a toothed belt drive for a double sickle harvesting header are carefully aligned relative to each other and to the toothed belt so that the belt can be twisted about its longitudinal axis during advancement along a closed loop path of travel in order to translate rotary motion about a first axis to rotary motion about a second axis which is inclined relative to the first axis. The toothed belt has semicylindrical teeth, and two idler pulleys contact a return portion of the belt to insure that the same are maintained in parallelism with grooves formed in sprockets of the mechanism in order to avoid imposition of side thrusts on the belt or undue wear on the teeth. The toothed belt reciprocates both sickles of the harvesting header in synchronous, timed fashion along directions opposite to each other so that vibrations which would otherwise be established by non-synchronous movement of the sickles are significantly dampened.

8 Claims, 2 Drawing Sheets

HARVESTING HEADER HAVING TIMED DOUBLE SICKLE TOOTHED BELT DRIVE

BACKGROUND OF THE INVENTION

1. Field of the Invention

This invention broadly relates to a drive mechanism for timed reciprocation of a double sickle assembly for use with harvesting and mowing equipment. More particularly, the invention concerns a drive mechanism having dual toothed belts (sometimes called "cog" belts) which are twisted to efficiently transfer rotary motion from a drive shaft to two sprockets oriented transversely to the drive shaft and eccentrically coupled to sway bars that are, in turn, connected to the sickles for oscillation of the latter. The center line of the driven sprocket connected to the sway bar is carefully aligned with the pitch circle of the belt that is trained about a sprocket affixed to the drive shaft to avoid imposition of undue wear on either of the sprockets or the belt.

2. Description of the Prior Art

Relatively large mowers and harvesters are often provided with two reciprocating sickles that extend across opposite sides of the front of the machine. Typically, each sickle reciprocates in a longitudinal direction by means of a respective sway bar that is carried along the sides of the machine and is coupled to an outermost end of the corresponding sickle. In turn, both of the sway bars are oscillated in some fashion or another by a drive mechanism which receives power from a common, rotating drive shaft.

As an example, U.S. Pat. No. 4,246,742 dated Jan. 27, 1981 describes and illustrates a drive mechanism for sway bars of a double sickle assembly wherein two connecting rods coupled to ends of the sway bars remote from the sickles are connected to eccentric cranks affixed to a central drive shaft. Each of the sway bars ocillates about a vertical pivot axis located in the middle of each sway bar, and ball and socket assemblies are used for drivingly interconnecting the forward end of each sway bar and the corresponding sickle to enable free, non-binding reciprocating motion of the latter.

The connecting rods of double sickle mechanisms of the type described in U.S. Pat. No. 4,246,742 are coupled to opposite sides of the crank on the central drive shaft so that the sway bars oscillate in a timed fashion and in opposite directions to enable the sickles connected thereto to simultaneously reciprocate in opposite directions and in a synchronous manner. As a result, vibrational forces which tend to be established by one of the sickles moving in one direction are counteracted by the forces generated by the other sickle moving in the opposite direction, such that the resultant sum of the vibrational forces is significantly diminished.

However, sway bars that are pivotal about a central axis located between a connecting rod coupled to the drive shaft and one end of a sickle bar are normally relatively long and thereby are of a sizable mass. Such construction necessarily increases the overall cost of the drive mechanism and requires the use of relatively large, expensive bearings for coupling the sway bars to the frame of the machine. Sway bars of this type occupy a substantial amount of space on each side of the machine.

Another type of drive mechanism which may be used in a double sickle assembly when chain-driven is shown in U.S. Pat. No. 3,941,003, dated Mar. 2, 1976. In U.S. Pat. No. 3,941,003, a relatively short sway bar is pivotally connected on one end to the frame of the machine and is connected at the opposite end to one end of a sickle; in addition, linkage is connected to the sway bar adjacent the sickle and is centrifugally coupled to a rotatable shaft extending transversely to the plane of reciprocation of the sway bar in order to impart movement to the latter and thereby the sickle.

The sickle drive mechanism shown in U.S. Pat. No. 3,941,003 includes a right angle gear box that is connected to the rotatable shaft and driven by a pulley that receives an endless V-belt which, in turn, is driven by one of two pulleys connected to a central drive shaft. This type of construction avoids the use of relatively large sway bars, although sizable expense and maintenance costs are associated with right angle gear boxes. More importantly, the use of smooth V-belts and pulleys effectively precludes the likelihood that each reciprocating sickle will inevitably move in synchronous fashion and in an opposite direction to the direction of movement of the other sickle.

In the past, belts having teeth have been used in other applications where the belt is intended to transmit rotary motion from one shaft to another, especially where it is desired to ensure movement of the shafts in timed, synchronous fashion. The teeth of the belt, whether of an elongated, semi-cylindrical toothed-type configuration or of a trapezoid shape, are serially received in a series of complementally configured grooves formed in the sprockets so that, for all practical purposes, slippage between the belt and either sprocket is precluded and timing between both sprockets cannot be lost.

However, it has long been believed that toothed belts, or belts with semi-cylindrical teeth, must not experience any degree of twist in the belt about its longitudinal axis as the belt moves along its closed loop path of travel and about the sprockets. To this end, much effort is normally undertaken to ensure that the centers of all sprockets receiving the belt lie in a common plane. It has been thought in this regard that any degree of twist experienced by the belt will cause the teeth to experience undue wear during engagement with grooves on the sprockets and considerably shorten the life of the belt. As a consequence, toothed belts have heretofore not been utilized to translate rotary motion about a first axis into rotary motion about a second axis which is inclined relative to the first axis in applications such as would be desirable in harvesting headers in order to avoid the need for right angle gear boxes and the like.

SUMMARY OF THE INVENTION

Our present invention represents a significant departure from past beliefs and provides an efficient and inexpensive drive mechanism for moving sickles of a double sickle assembly in opposite directions in timed, synchronous fashion relative to each other. More particularly, the drive mechanism of the present invention includes a toothed belt which is twisted 90° about its longitudinal axis in order to translate in timed fashion rotary motion about one axis to rotary motion about a second axis which is offset and perpendicular to the first axis. It has been found that careful, accurate alignment of one sprocket to the other enables the belt drive mechanism to operate over extended periods of time without imposition of undue amounts of wear on the teeth.

In accordance with the principles of the present invention, each side of a mower or harvester head is provided with a respective belt drive mechanism having a first or drive sprocket fixed to opposite, corresponding ends of a common drive shaft and a second or driven sprocket which is, in turn, eccentrically coupled to a sway bar connected to one end of a respective sickle. The first sprockets, being mounted on the drive shaft, rotate about a horizontal axis transverse to the path of travel of the machine, while the second sprockets are each mounted for rotation about respective axes which are inclined 90° relative to the axis of rotation of the first sprockets and which extend in a common plane parallel to a reference plane passing through the axis of rotation of the first sprockets.

The toothed belt presents a central pitch line which optionally lies in or closely adjacent to a plane which extends through glass fiber tensile cables or cords which serve as the pulling or load-carrying element of the belt. The tension members are also located along or adjacent a portion of sprocket pitch circles in regions of the belt which are in contact with sprockets. The sprockets are aligned such that the belt pitch line of the driving portion of the belt extends in straight fashion from the second or driven sprocket to the first or drive sprocket, with the belt pitch line of the driving portion lying along the intersection of planes of reference which extend through both sprockets in dissecting relationship to the grooves formed in the sprocket. In addition, the belt pitch line of the driving portion is oriented in tangential relationship relative to each of the sprocket pitch circles.

A return portion of the belt, extending from the first or drive sprocket to the second or driven sprocket, engages two flanged idler pulleys which guide the return portion of the belt toward the second sprocket while twisting the same about its longitudinal axis in an opposite 90° arc. The axis of rotation of one of the idler pulleys which is adjacent the second sprocket is selectively pivotal through an arc to enable such pulley to be precisely adjusted to an orientation which ensures that the return portion of the belt is precisely guided toward the center of the second sprocket, which has grooves somewhat wider than the overall width of the belt.

Importantly, both sprockets of the drive mechanism as well as the idler pulleys are positioned so that each tooth of the toothed belt is received in grooves of the first and second sprocket with the longitudinal axis of each tooth being parallel to the longitudinal axis of the corresponding groove during reception therein. In this manner, side thrusts on the belt are substantially eliminated and undue wear on the teeth of the belt is avoided.

DETAILED DESCRIPTION OF THE DRAWINGS

A harvester header 10 as depicted in FIGS. 1–4, includes a frame 12 having two side plates 14, 14 which extend along opposite sides of the header 10 in a direction parallel to the normal path of travel of the latter during advancement across the ground The side plates 14, 14 are fixedly interconnected by beams 16 (FIG. 2) which span the width of frame 12.

Figure 1:
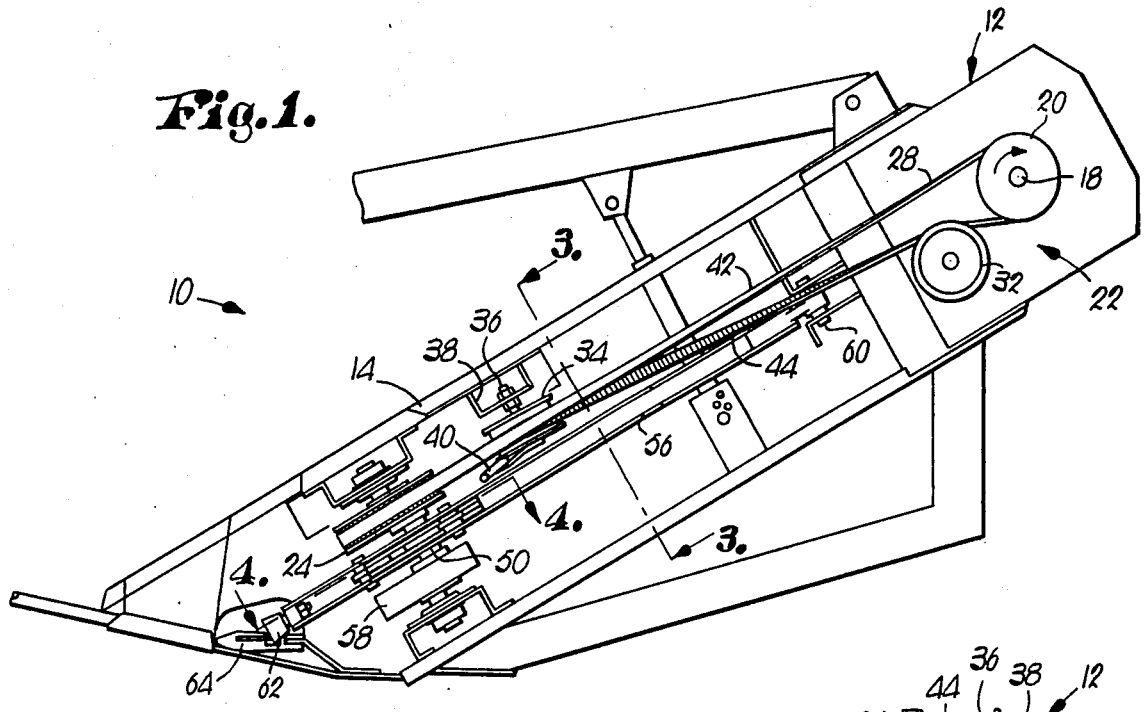
FIG. 1 is a fragmentary, side elevational view of a harvester header having a timed double sickle toothed belt drive constructed in accordance with the principles of the present invention, with parts shown in section.
Figure 2:
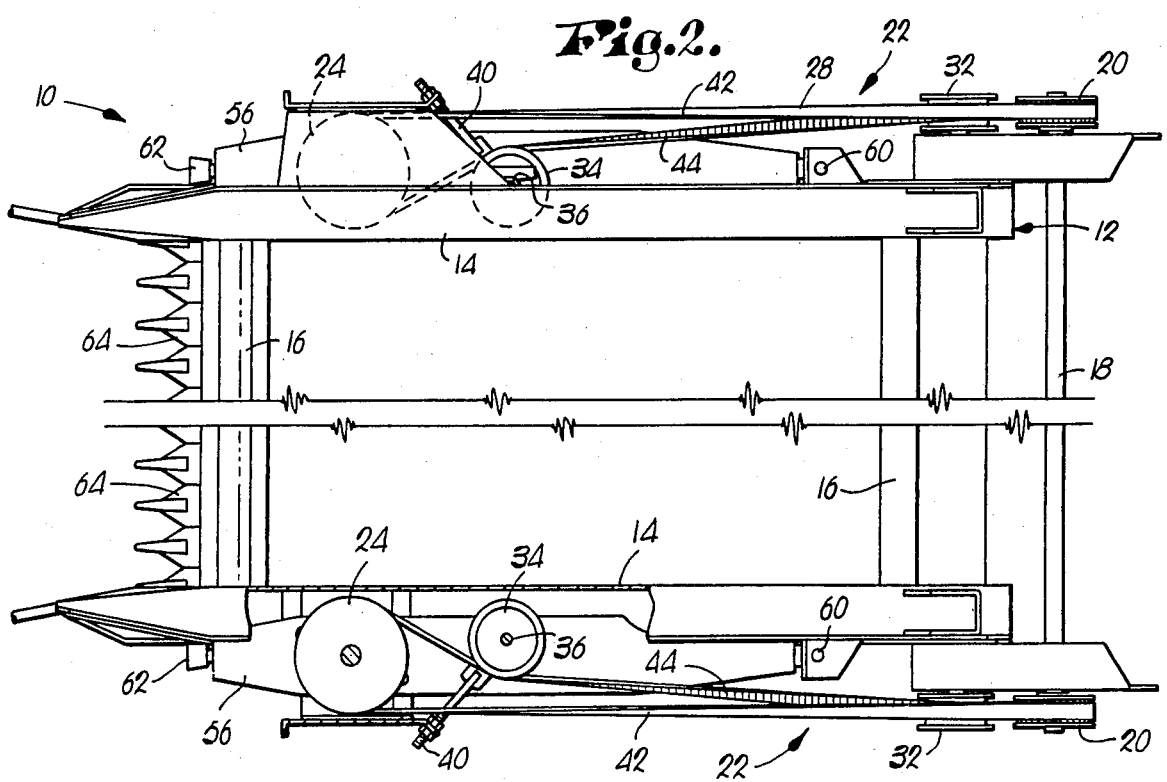
FIG. 2 is a fragmentary, plan view of the harvester shown in FIG. 1 with certain components depicted in section, and illustrating two toothed belt drives disposed on opposite sides of the harvester for reciprocating the sickles in timed, synchronous fashion.

A driveshaft 18, as illustrated in FIGS. 1 and 2, extends in a horizontal plane in a direction transverse to the direction of advancement of header 10. The driveshaft 18 is powered by a source of rotary power (not shown) and is secured on opposite end regions to one of two drive sprockets 20 which comprise a part of respective drive mechanisms broadly designated 22. Each of the drive mechanisms 22, being disposed on opposite sides of the header 10 adjacent side plates 14, are substantially identical and thus the following description will be directed toward only the lower mechanism 22 which is illustrated in FIG. 2.

Figure 5:
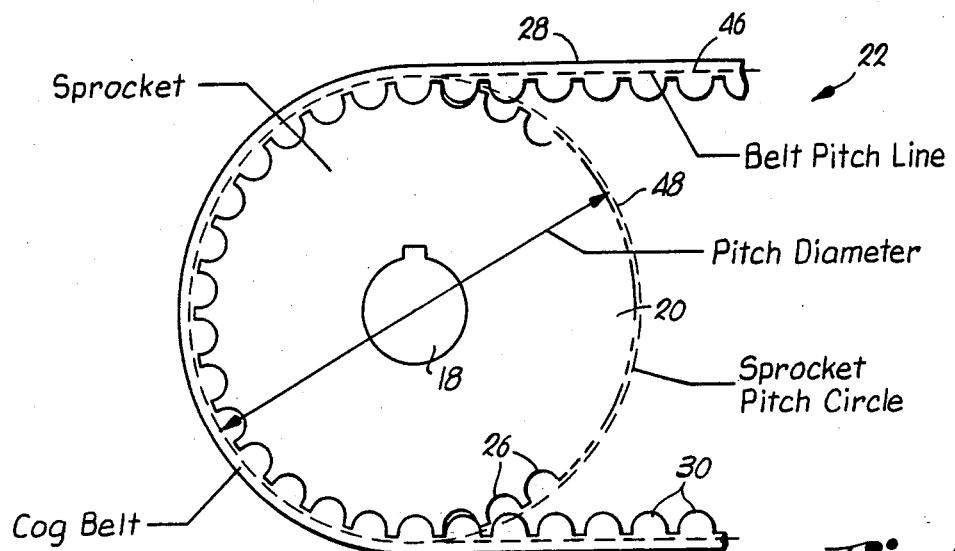
FIG. 5 is a fragmentary, enlarged, crosssectional view of the toothed belt and the drive sprocket with identifying nomenclature.

In addition to the first or drive sprocket 20, the drive mechanism 22 includes a second or driven sprocket 24. Each of the sprockets 20, 24 have structure presenting a number of grooves 26 which are disposed around the circumference or periphery of the respective sprockets 20, 24 and which extend in directions parallel to the axes of rotation of the sprockets 20, 24 respectively. Referring to FIG. 5, the grooves 26 for the first sprocket 20 are of a semi-cylindrical configuration which is identical to the configuration of the grooves 26 formed in the second sprocket 24.

Each drive mechanism 22 further includes an endless toothed belt 28 that is trained about the first sprocket 20 and the second sprocket 24 for driving the latter from drive shaft 18. The belt 28 has a spaced series of parallel, semi-cylindrical teeth 30 which are complemental in configuration to the grooves 26 of sprockets 20, 24. During advancement of the belt 28 about the sprockets 20, 24 the teeth 30 serially received in respective grooves of the first and second sprocket in the manner depicted for exemplary purposes in FIG. 5.

As illustrated in FIGS. 1 and 2, two idler pulleys 32, 34 are connected to the frame 12 for rolling engagement with the back side of belt 28 during advancement of the latter around its closed loop path of travel. Idler pulley 32, disposed adjacent first sprocket 20, rotates about an axis parallel to the axis of rotation of driveshaft 18 and sprocket 20. On the other hand, idler pulley 34, located adjacent the second sprocket 24, rotates about an axis which is slightly inclined with respect to the axis of rotation of second sprocket 24.

Figure 3:
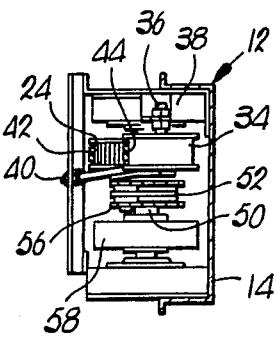
FIG. 3 is a cross-sectional view taken along line 3—3 of FIG. 1 and showing an adjustable idler pulley of one of the drive mechanisms, along with a flywheel aligned below a second sprocket of the drive mechanism.
Figure 4:
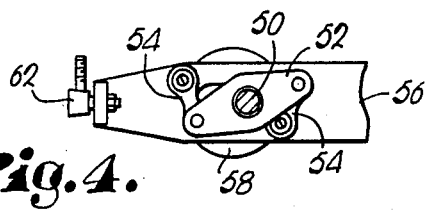
FIG. 4 is a fragmentary, sectional view taken along line 4—4 of FIG. 1 and illustrating a drive member eccentrically coupled to the second sprocket and linkage connected to the drive member for oscillation of a sway bar which reciprocates one of the sickles.

As shown in FIGS. 1–3, idler pulley 34 is mounted on a stud 36 fixed to a bracket 38. The stud 36 is also coupled to a threaded adjustment element 40 which enables the angle of inclination of the rotational axis of the idler pulley 34 to be selectively variable for reasons which will become apparent hereinafter. During adjustment of element 40, bracket 38 flexes slightly to enable movement of the stud 36 in a plane passing through the longitudinal axis of stud 36 as well as the longitudinal axis of the adjusting element 40. As can be observed in FIG. 3, the threaded adjustment element 40 is coupled by two nuts to opposite sides of a member of frame 12 for permitting selective adjustment of the longitudinal position of the elements 40 relative to frame 12 and to thereby retain the stud 36 in a selective orientation against any resistance presented by flexure of bracket 38.

The toothed belt 28 during advancement thereof presents an elongated driving portion 42 (FIGS. 1 and 2) which extends from the second sprocket 24 and toward the first sprocket 20. The driving portion 42 is twisted in a 90° arc about its longitudinal axis to enable the teeth 30 of the belt 28 to be received in respective grooves 26 of the first drive sprocket 20 with the longitudinal axis of each tooth being parallel to the longitudinal axis of the corresponding groove 26 during reception therein.

The toothed belt 28 during advancement thereof also presents an elongated return portion 44 which extends from the first sprocket 20 and toward the second sprocket 24. The pulleys 32, 34 represent a means for guiding the return portion 44 of the toothed belt 28 toward the second sprocket 24. The adjustable idler pulley 34 is also operable to twist the return portion 44 of the toothed belt 28 about its longitudinal axis in a 90° arc opposite in direction to the direction of twist of the driving portion 42. As such, the longitudinal axis of each tooth 30 during advancement of the belt 28 is brought into parallelism with the longitudinal axis of the respective groove 26 of the second sprocket 24 before reception therein.

Preferably, the belts are constructed with a series of tension members comprised of a material such as glass fiber, helically wound cables or cords. The tensile members function as a pulling or load-carrying element of the belt 28, while also improving the belt's resistance to elongation.

In practice, satisfactory results have been observed by use of toothed belts available from Dayco Corporation Rubber Products Company of Dayton, Ohio. In one example, a Dayco belt identified as #3280-8M was used which has a pitch length of 3,280 millimeters, a width of 30 millimeters and 420 semicylindrical teeth spaced along the inside perimeter of the belt. This type of belt also has neoprene teeth, a neoprene backing encasing helically wound, glass fiber tensile members or cords, and a wear-resistant nylon facing fabric that covers the teeth and other wearing surfaces of the belt; the nylon facing, during extended periods of service, becomes highly polished and normally outlasts other components of the belt.

In the foregoing example, Dayco sprockets were used and sprocket No. P56-8M-50 functioned as the drive sprocket 20 while sprocket No. P80-8M-50 served as the second or driven sprocket 24. The drive sprocket has a pitch diameter of 5.61 inches and 56 grooves, while the second or driven sprocket 24 has a pitch diameter of 8.02 inches with 80 grooves. Both sprockets had flanges extending above the grooves, and were of a 50 millimeter width which is larger than the width of belt 28 as can be seen by viewing to FIG. 1.

Referring now to FIG. 5, the tension members of the toothed belt 28 are optionally disposed in a plane that extends through the line designated as belt pitch line 46.

In addition, the tension members are optionally located in alignment with a portion of sprocket pitch reference circles 48 which extend circumferentially around the perimeter of both sprockets 20, 24 in spaced relationship to the same. The pitch line is located approximately ⅓ of the distance between the root of teeth 30 and the back of toothed belt 28.

Figure 6:
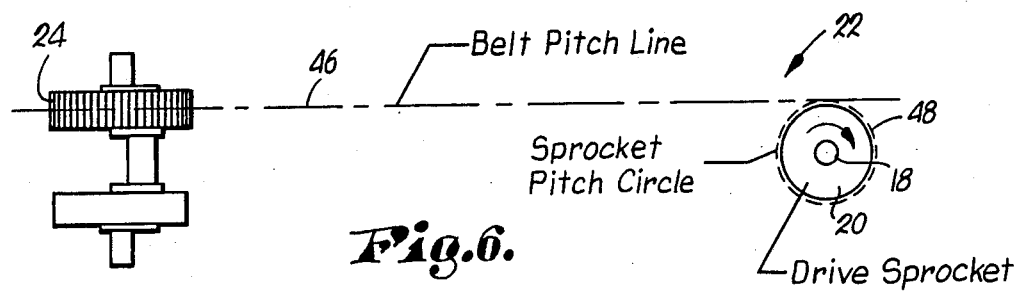
FIGS. 6–7 are essentially schematic representations of the first and second sprockets illustrating the relationship between a belt pitch line extending along a driven portion of the belt, sprocket pitch circles, and the rotational axes of the respective sprockets.
Figure 7:
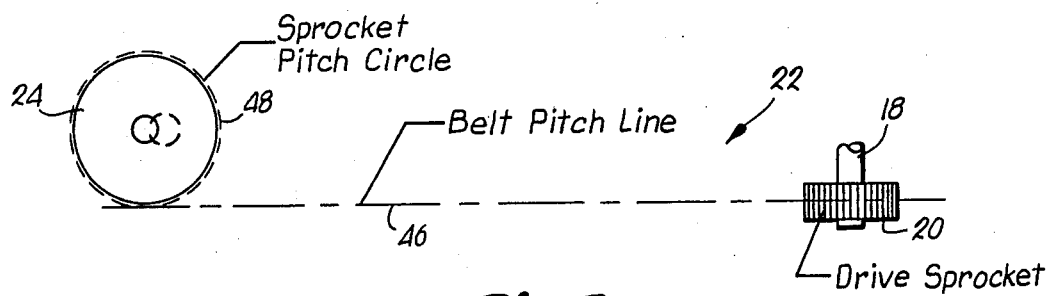

To ensure that the toothed belt 28 functions properly over extended periods of time, careful alignment of the sprockets 20, 24 is necessary during assembly of drive mechanism 22. More specifically, and as illustrated schematically in FIGS. 6 and 7, the pitch line of the driving portion 42 of belt 28 lies precisely along the intersection of two planes of reference which extend through the sprockets 20, 24 respectively in bisecting relationship to the grooves 26 of the corresponding sprockets 20, 24. Moreover, the belt pitch line of the driving portion 42 is oriented in tangential relationship relative to each of the sprocket pitch circles 48.

On the return portion 44 of belt 28, idler pulley 34 is carefully adjusted until belt 28 during advancement thereof extends toward the center of second sprocket 24. To this end, the axis of rotation of idler pulley 34 is normally slightly inclined from the rotational axis of second sprocket 24 As a consequence, the teeth 30 of the return portion 44 of belt 28 will be brought into parallelism with the longitudinal axis of the respective grooves 26 of sprocket 24 to avoid undue wear on the teeth 30 or the imposition of side thrusts on the belt 28.

Referring again to FIG. 1, the second sprocket 24 of drive mechanism 22 is connected to a shaft or member 50 which is eccentrically mounted on sprocket 24. In turn, the member 50 extends through a linkage 52 (see also FIGS. 3–4) that is pivotally connected on opposite ends to two short pitman arms 54, 54. The pitman arms 54 are pivotally coupled to an elongated sway bar 56 (in this regard, see FIG. 2).

A flywheel 58 is also connected to the shaft member 50 in disposition below sway bar 56. The sway bar 56 is connected to the frame 20 by pivot 60 (FIGS. 1 and 2) for oscillation in a plane transverse to the rotational axis of second sprocket 24 A ball and socket connection 62 is coupled to the opposite end of the sway bar 56 remote from pivot 60 and is also connected to one end of a sickle 64 for reciprocation thereof in a direction parallel to the direction of oscillation of sway bar 56.

The components interconnecting the drive member 50 and sickle 64, including linkage 52, pitman arms 54 and sway bar 56 can be better understood by reference to the aforementioned U.S. Pat. No. 3,941,003 which is assigned to the assignee of the present invention. The sickle 64 cuts a swath in the field in otherwise conventional fashion as the header 10 is advanced over the ground.

As should now be evident from the foregoing, the present invention provides an effective means for translating rotary motion about a first axis lying in a reference plane to rotary motion about a second axis which is inclined relative to the first axis and which extends in a plane substantially parallel to the reference plane. Thus, the structure of the present invention is especially useful, as shown in the drawings, for insuring that the sickles 64 mounted on opposite sides of the header 10 reciprocate in synchronous fashion and in timed relationship to each other in such a manner that one sickle 64 is always moving in a direction opposite to the direction of motion to the remaining sickle 64. However, it is to be understood in this regard that the invention should be deemed to be limited only by a fair scope of the claims which follow, along with their mechanical equivalents thereof.

We claim:

1. A belt drive mechanism for translating rotary motion about a first axis lying in a reference plane to rotary motion about a second axis which is inclined relative to said first axis and which extends in a plane substantially parallel to said reference plane, said mechanism comprising:

a first sprocket rotatable about said first axis and adapted to be coupled to a source of rotary power;

a second sprocket rotatable about said second axis, said first sprocket and said second sprocket each having structure presenting a number of grooves extending in direction parallel to said first axis and second axis respectively;

an endless belt trained about said first sprocket and said second sprocket for driving the latter from said source of power, said belt having a series of teeth complemental in configuration to said grooves of said first and said second sprockets, said teeth being serially received in respective grooves of said first sprocket and said second sprocket as the belt is advanced along a continuous loop path of travel about said first and second sprockets, said belt during advancement thereof presenting an elongated driving portion extending from said second sprocket and toward said first sprocket, said driving portion being smoothly twisted along its entire driving portion being smoothly twisted along its entire length in a certain arc about its longitudinal axis equal to the angle of inclination of said second axis relative to said first axis to thereby enable said teeth to be received in respective grooves of said first sprocket with the longitudinal axis of each tooth being substantially parallel to the longitudinal axis of the corresponding groove during reception therein, said belt during advancement thereof having an elongated return portion extending from said sprocket and toward said second sprocket; and means for guiding the return portion of said belt toward said second sprocket and including at least one pulley disposed between said first sprocket and said second sprocket for twisting the return portion of said belt about its longitudinal axis in an arc opposite in direction to said certain for serially bringing the longitudinal axes of said teeth of said belt into substantial parallelism with the longitudinal axes of the respective grooves of said second sprocket before reception therein, said driving portion of said belt presenting a straight pitch line extending the entire distance between said second sprocket and said first sprocket, said pitch line being perpendicular to said first axis and said second axis, said pitch line extending in reference which each bisect the lengths of each groove of said first sprocket and said second sprocket respectively, said belt during advancement thereof having sprocket-engaging portions in contact with said first sprocket and said second sprocket, said sprocket engaging portions lying in pitch circles, said straight pitch line being tangent to each of said pitch circles.

2. The invention as set forth in claim 1, wherein each of said teeth have a generally semicircular configuration in planes transverse to the longitudinal axes of said teeth.

3. The invention as set forth in claim 1, wherein said pulley is rotatable about an axis extending in a plane parallel to said reference plane and inclined at an angle relative to said first axis.

4. The invention as set forth in claim 1, wherein said angle of inclination of the rotational axis of said pulley is selectively variable.

5. The invention as set forth in claim 4, wherein said angle of inclination of said rotational axis of said pulley is closely equal to the angle of said second axis relative to said first axis.

6. In a double sickle assembly having a pair of sickles, a pair of sway bars each connected to a respective sickle and oscillable in reference planes for reciprocation of the sickles, a pair of drive members rotatable about respective axes generally transverse to said reference planes and coupled to a respective one of said sway for oscillation of the latter, and a powered drive shaft rotatable about an axis generally parallel to said reference planes, a timed pair of drive mechanisms interconnecting said drive shaft and a respective one of said pair of drive members, each drive mechanism comprising:

a first sprocket connected to said drive shaft for rotation therewith;

a second sprocket coupled to one of said drive members and rotatable about an axis which is parallel to the axis of rotation of the respective drive member and which is inclined a certain angular magnitude relative to the axis of rotation of said drive shaft, said first sprocket and said second sprocket each having structure presenting a number of grooves extending in directions parallel to the axes of rotation of said drive shaft and said one drive member respectively;

an endless belt trained about said first sprocket and said second sprocket for driving the latter from said drive shaft, said belt having a series of teeth complemental in configuration to said grooves of said first and second sprockets, said teeth being serially received in respective grooves of said first sprocket and said second sprocket as the belt is advanced along a continuous loop path of travel about said first and second sprockets, said belt during advancement thereof presenting an elongated driving portion extending from said second sprocket and toward said first sprocket, said driving portion being smoothly twisted along its entire length in a certain arc about its longitudinal axis equal in magnitude to said certain angular magnitude to thereby enable said teeth to be received in respective grooves of said first sprocket during advancement of the belt with the longitudinal axis of each tooth being substantially parallel to the longitudinal axis of the corresponding groove during reception therein, said belt during advancement thereof having an elongated return portion extending from said first sprocket and toward said second sprocket; and means for guiding the return portion of said belt toward said second sprocket and including at least one pulley disposed between said first sprocket and said second sprocket for twisting the return portion of said belt about its longitudinal axis in an arc opposite in direction to said certain arc for serially bringing the longitudinal axes of said teeth of said belt during advancement thereof into substantial parallelism with the longitudinal axes of the respective grooves of said second sprocket before reception therein such that said teeth of said belt of each mechanism enable each sickle to reciprocate in opposite, timed relation to the reciprocation of the other sickle, said driving portion of said belt presenting a straight pitch line extending the entire distance between said second sprocket and said first sprocket, said pitch line being perpendicular to said first axis and said second axis, said pitch line extending in reference planes which each bisect the lengths of each groove of said first sprocket and said second sprocket respectively, said belt during advancement thereof having sprocket-engaging portions in contact with said first sprocket and said second sprocket, said sprocket engaging portions lying in pitch circles, said straight pitch line being tangent to each of said pitch circles.

7. The invention as set forth in claim 6, wherein said drive shaft presents opposite end regions, and wherein said first sprockets of each mechanisms are directly fixed to a respective one of said end regions.

8. The invention as set forth in claim 6, wherein each of said teeth have a generally semicircular configuration in planes transverse to the longitudinal axes of said teeth.

* * * * *